(12) United States Patent
Shearer

(10) Patent No.: US 7,808,500 B2
(45) Date of Patent: Oct. 5, 2010

(54) METHOD FOR IMPROVING SPATIAL INDEX EFFICIENCY BY JITTERING SPLITTING PLANES

(75) Inventor: Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 11/562,166

(22) Filed: Nov. 21, 2006

(65) Prior Publication Data

US 2008/0117206 A1 May 22, 2008

(51) Int. Cl.
*G06T 17/00* (2006.01)
*G06T 15/00* (2006.01)
*G06T 15/40* (2006.01)
*G06T 15/50* (2006.01)
*G06T 15/60* (2006.01)
*G06T 9/00* (2006.01)
*G06F 12/02* (2006.01)

(52) U.S. Cl. .................. 345/420; 345/419; 345/421; 345/426; 345/428; 345/544; 345/555

(58) Field of Classification Search .............. 345/419, 345/420, 421, 426, 544, 555
See application file for complete search history.

(56) References Cited

U.S. PATENT DOCUMENTS

| | | | | |
|---|---|---|---|---|
| 5,666,474 | A * | 9/1997 | Otto .......................... | 345/421 |
| 6,580,426 | B1 * | 6/2003 | Small et al. .................. | 345/421 |
| 7,002,571 | B2 * | 2/2006 | Lake et al. .................. | 345/420 |
| 7,495,664 | B2 * | 2/2009 | Keller et al. ................. | 345/426 |
| 2004/0095343 | A1 * | 5/2004 | Forest et al. ................. | 345/419 |
| 2006/0098009 | A1 * | 5/2006 | Zuniga ........................ | 345/421 |
| 2008/0024489 | A1 * | 1/2008 | Shearer ....................... | 345/421 |
| 2008/0074416 | A1 * | 3/2008 | Brown et al. ................. | 345/420 |
| 2008/0074417 | A1 * | 3/2008 | Mejdrich et al. ............. | 345/420 |
| 2008/0088619 | A1 * | 4/2008 | Shearer et al. ............... | 345/420 |
| 2008/0088622 | A1 * | 4/2008 | Shearer ....................... | 345/421 |
| 2008/0170071 | A1 * | 7/2008 | Shearer ....................... | 345/427 |

(Continued)

OTHER PUBLICATIONS

Samanta et al., "Load balancing for multiprojector rendering systems", Eurographics/SIGGRAPH workshop on Graphics hardware, Los Angeles, CA, Aug. 1999, ACM Press, pp. 107-116.*

(Continued)

*Primary Examiner*—Ulka Chauhan
*Assistant Examiner*—Roberta Prendergast
(74) *Attorney, Agent, or Firm*—Patterson & Sheridan LLP

(57) ABSTRACT

Embodiments of the invention provide methods and apparatus to improve the efficiency of a ray tracing image processing system. According to one embodiment of the invention, when building a spatial index the position of a splitting plane used to create a bounding volume may be jittered or moved along an axis to determine if a more efficient location for the splitting plane exists. After jittering the splitting plane a number of primitives intersected by the splitting plane may be calculated. The number of primitives intersected by the splitting plane for each location may be compared, and the location with the fewest intersected primitives may be chosen for the final position of the splitting plane. By choosing the location with the fewest intersected primitives the number of ray-primitive intersection tests necessary when performing ray tracing may be reduced. Consequently, the efficiency of the image processing system may be improved.

12 Claims, 12 Drawing Sheets

U.S. PATENT DOCUMENTS

2009/0189898 A1* 7/2009 Dammertz et al. .......... 345/426

OTHER PUBLICATIONS

Harter, et al., "Soft Shadow Volumes for Ray Tracing with Frustum Shooting", Masters Thesis, Chalmers University of Technology, 9 pages, Feb. 2006, http://www.cse.chalmers.se/~uffe/.*

Elhassan, Ikrima. "An Analysis Of GPU-based Interactive Raytracing". The University of Texas at Austin, Department of Computer Sciences. Report# HN-06-12 (honors). May 2006. 8 pages.*

Foley, T. and Sugerman, J., "KD-tree acceleration structures for a GPU raytracer", Proceedings of the ACM SIGGRAPH/EUROGRAPHICS Conference on Graphics Hardware, Los Angeles, California, Jul. 30-31, 2005, HWWS '05, ACM, New York, NY, pp. 15-22.*

Glazer, Brendon C., "Interactive Ray Tracing of VRML Scenes in Java", Master of Engineering Thesis, Massachusetts Institute of Technology, Feb. 1999, 70 pages.*

V. Havran et al., "On fast construction of spatial hierarchies for ray tracing", Proceedings of the 2006 IEEE Symposium on Interactive Ray Tracing, Sep. 2006.*

Mayer, A. J., "Dynamic Occlusion Culling", Courses, Seminar, WS2006, Institute of Computer Graphics and Algorithms, Vienna University of Technology, 2006, http://www.cg.tuwien.ac.at/courses/Seminar/WS2006/dynamicvisibility.pdf.*

Shade et al., "Hierarchical image caching for accelerated walkthroughs of complex environments", Proceedings of the 23rd Annual Conference on Computer Graphics and interactive Techniques SIGGRAPH '96. ACM, New York, NY, Jul. 1996, pp. 75-82.*

Shagam J., "Dynamic spatial partitioning for real-time visibility determination", Informatique, New Mexico State University, Department of computer science, Technical Report NMSU-CS-2003-004, Apr. 7, 2003, pp. 1-9.*

Stefan Popov, et al., "Experiences with Streaming Construction of SAH KDTrees", Proceedings of the 2006 IEEE Symposium on Interactive Ray Tracing, pp. 89-94, Sep. 18-20, 2006.*

Szirmay-Kalos, et al., "On the efficiency of ray-shooting acceleration schemes", Proceedings of the 18th Spring Conference on Computer Graphics, Budmerice, Slovakia, Apr. 24-27, 2002, SCCG '02, ACM, New York, NY, pp. 97-106.*

Wald et al., "Distributed Interactive Ray Tracing of Dynamic Scenes", Proceedings of the 2003 IEEE Symposium on Parallel and Large-Data Visualization and Graphics, Oct. 20-21, 2003, Parallel and large-data visualization and graphics, IEEE Computer Society, Washington, DC, pp. 77-85.*

Woop et al., "B-KD trees for hardware accelerated ray tracing of dynamic scenes", Proceedings of the 21st ACM SIGGRAPH/EUROGRAPHICS Symposium on Graphics Hardware, Vienna, Austria, Sep. 3-4, 2006, GH '06, ACM, New York, NY, pp. 67-77.*

Gummerus, S., "Conservative from Point Visibility", Master's Thesis, University of Tampere, Dec. 2003, 77 pages, p. 22.*

Lext, J., Assarsson, U., and Moeller, T. 2000. "BART: A Benchmark for Animated Ray Tracing", Technical report, Department of Computer Engineering, Chalmers University of Technology, Goeteborg, Sweden, May 2000, pp. 22-31, Available at http://www.ce.chalmers.se/BART/.*

* cited by examiner

METHOD FOR IMPROVING SPATIAL INDEX EFFICIENCY BY JITTERING SPLITTING PLANES

BACKGROUND OF THE INVENTION

1. Field of the Invention

Embodiments of the invention generally relate to the field of image processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention a method creating a spatial index having nodes representing bounding volumes in a three dimensional scene is provided. The method generally comprising: a) drawing an initial splitting plane within a bounding volume at a first point along a reference axis; b) determining a number of primitives intersected by the initial splitting plane; and c) jittering the splitting plane along the reference axis to determine a location for the splitting plane where fewer primitives are intersected.

According to another embodiment of the invention a computer readable medium containing a program which, when executed, performs operations to build a spatial index having nodes representing bounding volumes within a three dimensional scene is provided. The operations generally comprising: a) drawing an initial splitting plane within a bounding volume at a first point along a reference axis; b) determining a number of primitives intersected by the initial splitting plane; and c) jittering the splitting plane along the reference axis to determine a location for the splitting plane where fewer primitives are intersected.

According to another embodiment of the invention an image processing system is provided. The image processing system generally comprising: a spatial index having nodes representing bounding volumes within a three dimensional scene; one or more processing elements configured to trace rays through the three dimensional scene by traversing rays through the spatial index; and logic configured to create the spatial index by drawing an initial splitting plane within a bounding volume at a first point along a reference axis; determining a number of primitives intersected by the initial splitting plane; jittering the splitting plane along the reference axis to determine a location for the splitting plane where fewer primitives are intersected; and store the splitting plane location in the spatial index.

DETAILED DESCRIPTION OF THE PREFERRED EMBODIMENTS

Figure 1:
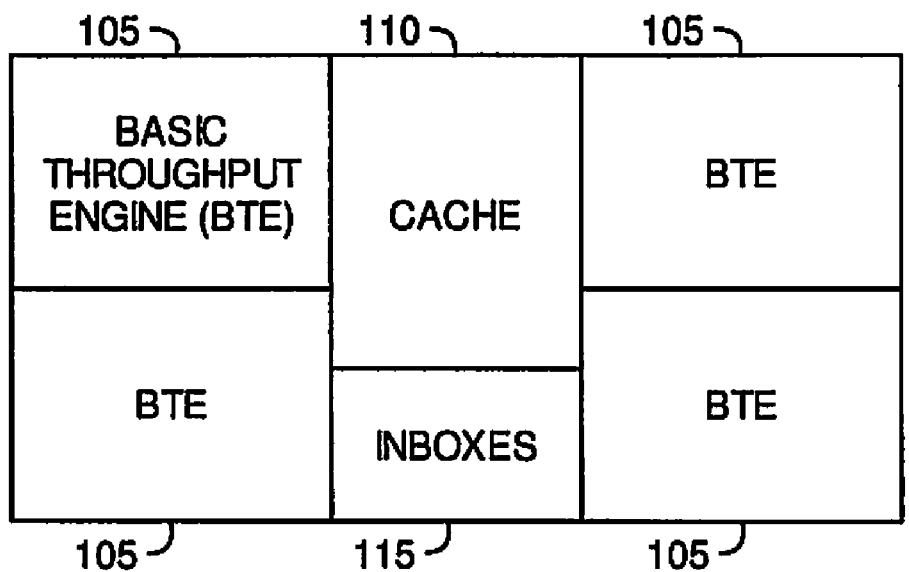
FIG. 1 is a block diagram depicting an exemplary computer processor, according to one embodiment of the invention.

Embodiments of the invention provide methods and apparatus to improve the efficiency of a ray tracing image processing system. According to one embodiment of the invention, the position of a splitting plane used to create a bounding volume may be modified in both a positive and negative direction along an axis to determine if a more efficient location for the splitting plane exists. After a modification in either direction a number of primitives intersected by the splitting plane may be calculated. The number of primitives intersected by the splitting plane for each location (e.g., modified location in positive direction, modified location in negative direction, or original location) may be compared, and the location with the fewest intersected primitives may be chosen for the final position of the splitting plane. By choosing the location with the fewest intersected primitives the efficiency of the image processing system may be improved.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the image processing system described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Multiple Core Processing Element

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element memory cache 110 (e.g., a shared L2 cache).

The BTEs 105 may also have access to a plurality of inboxes 115. The inboxes 115, described further below with regards to FIGS. 3A-3C, may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low-latency and high-bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three-dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. According to one embodiment of the invention, the vector throughput engines may then determine if the ray intersects a primitive contained within the bounding volume. The vector throughput engines may also perform operations relating to determining the color of the pixel through which the ray passed.

Figure 2:
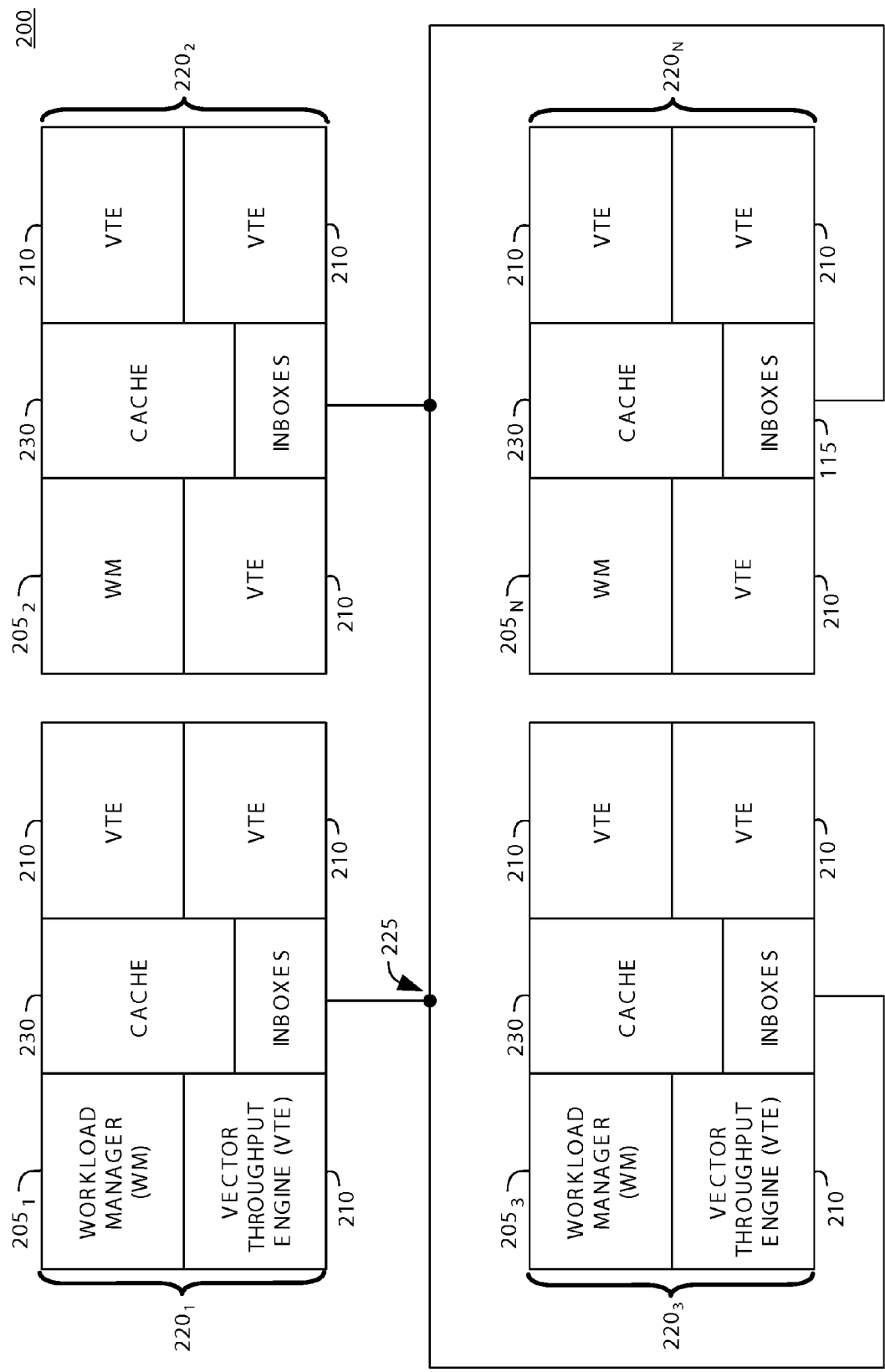
FIG. 2 illustrates a multiple-core processing element network, according to one embodiment of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $205_{1-N}$ may use a high speed bus 225 to communicate with other workload managers $205_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload managers $205_{1-N}$ may use the high speed bus 225 to collect and distribute image processing related tasks to other workload managers $205_{1-N}$, and/or distribute tasks to other vector throughput engines 210. The use of a high speed bus 225 may allow the workload managers $205_{1-N}$ to communicate without affecting the caches 230 with data packets related to workload manager $205_{1-N}$ communications.

Low-Latency High-Bandwidth Communications Network

As described above, the aggregate performance of an image processing system may be tied to how well the BTEs can partition and redistribute work. According to one embodiment of the invention, memory space within a cache, referred to as a memory inbox, may be used to distribute work to a single processor thread. In an image processing system using a plurality of processors each having a plurality of threads, the collection of inboxes together may be referred to as a low-latency high-bandwidth communications network.

In multithreading processor such as a BTE 105, a memory inbox may be assigned to a given thread (referred to herein as the owner thread). In one embodiment of the invention, the memory space for the inbox may be allocated from the shared memory cache 110 exclusively to the owner thread. By exclusively assigning the memory space in a cache to the owner thread, the owner thread may maintain enough memory space to cache its own instructions and data without other having other competing threads displace the owner thread's instructions and data. Thus, the memory inbox may improve execution of the owner thread by maintaining the owner thread's data and instructions in the assigned inbox portion of the cache and reducing the possibility of stalling the owner thread while data and instructions for the owner thread are retrieved from higher levels of memory. Furthermore, by assigning the memory space in a cache to the owner thread, data or instructions intended for the targeted thread may be stored only in an inbox allocated to the thread. Thus, data or instructions intended for the targeted thread are not stored throughout the shared memory cache 110, rather only in the inbox allocated to the targeted thread.

Furthermore, the inbox memory may be used by other threads to efficiently communicate with the owner thread. For example, where another thread has data and/or instructions which are to be provided to the owner thread for an inbox, the other thread may send the data and/or instructions to the inbox where the data and/or instructions may be retrieved by the owner thread. Similarly, in some cases, the owner thread may use the inbox as an outbox to communicate information with other threads. For example, to communicate the information with another thread, the owner thread may place the information in the inbox and send a notification to the other thread indicating the location of the data and/or instructions, thereby allowing the other thread to retrieve the information. Optionally, the owner thread may provide the information directly to the inbox of the other thread. Thus, the inbox memory may be used to simplify communication between a sending and a receiving thread while preventing displacement of data and/or instructions being used by other threads.

Figure 3A:
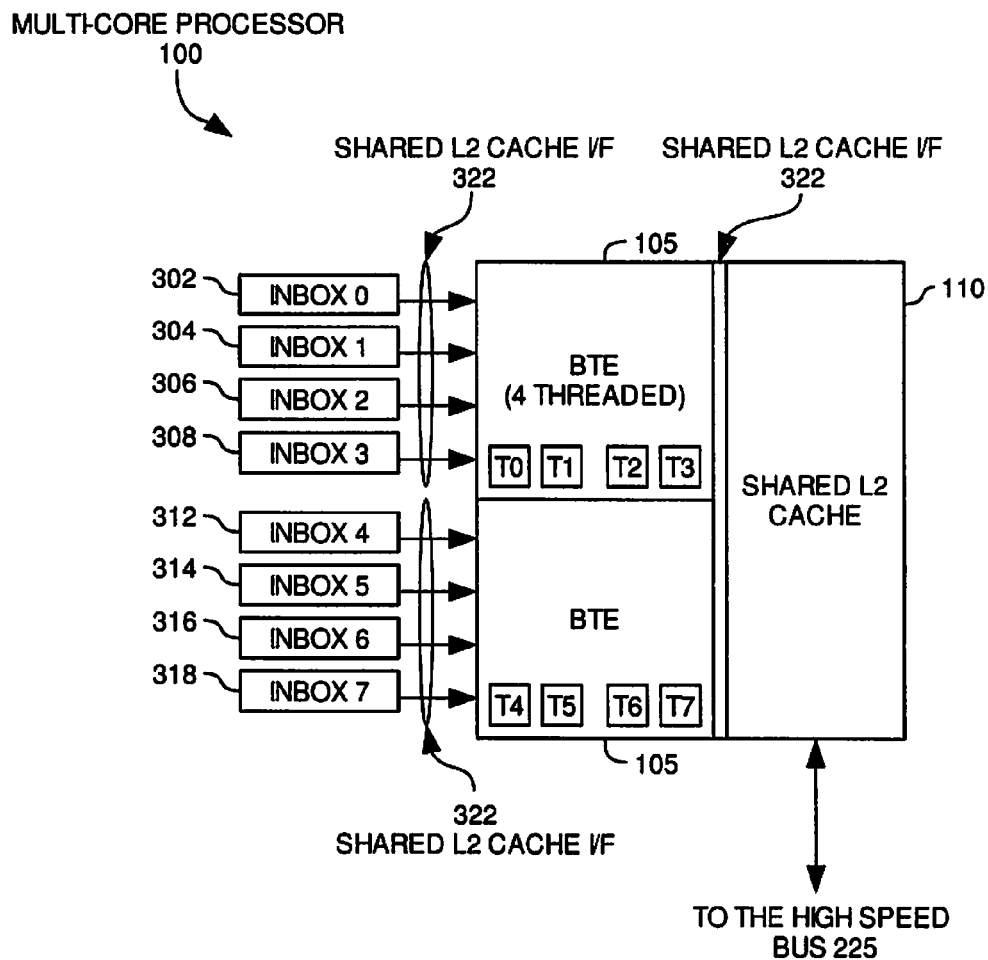
FIGS. 3A-3C are block diagrams illustrating aspects of memory inboxes according to one embodiments of the invention.

FIG. 3A is a block diagram of memory inboxes 302 ... 318 in a multi-core processor element 100 according to one embodiment of the invention. The depiction of the memory inboxes 302 ... 318 is intended to be a conceptual view and therefore is not limited to any particular physical configuration. As depicted, threads (e.g., threads T0-T7) executing in each core (e.g., the BTEs 105) may have access to the shared L2 cache 110 via a shared L2 cache interface 322. Furthermore, the L2 cache interface 322 may also be used by the threads T0 . . . T7 to access the corresponding memory inboxes 302 ... 318. As described above, in some cases, each inbox 302 ... 318 may be assigned to a corresponding thread T0-T7. Thus, Inbox 0 302 may be assigned to thread T0 and so on. As described below, by assigning a given inbox to a given thread, access to the assigned inbox may be unrestricted with respect to the owner thread while access by other threads may be restricted. Exemplary restrictions are described below in greater detail.

Figure 3B:
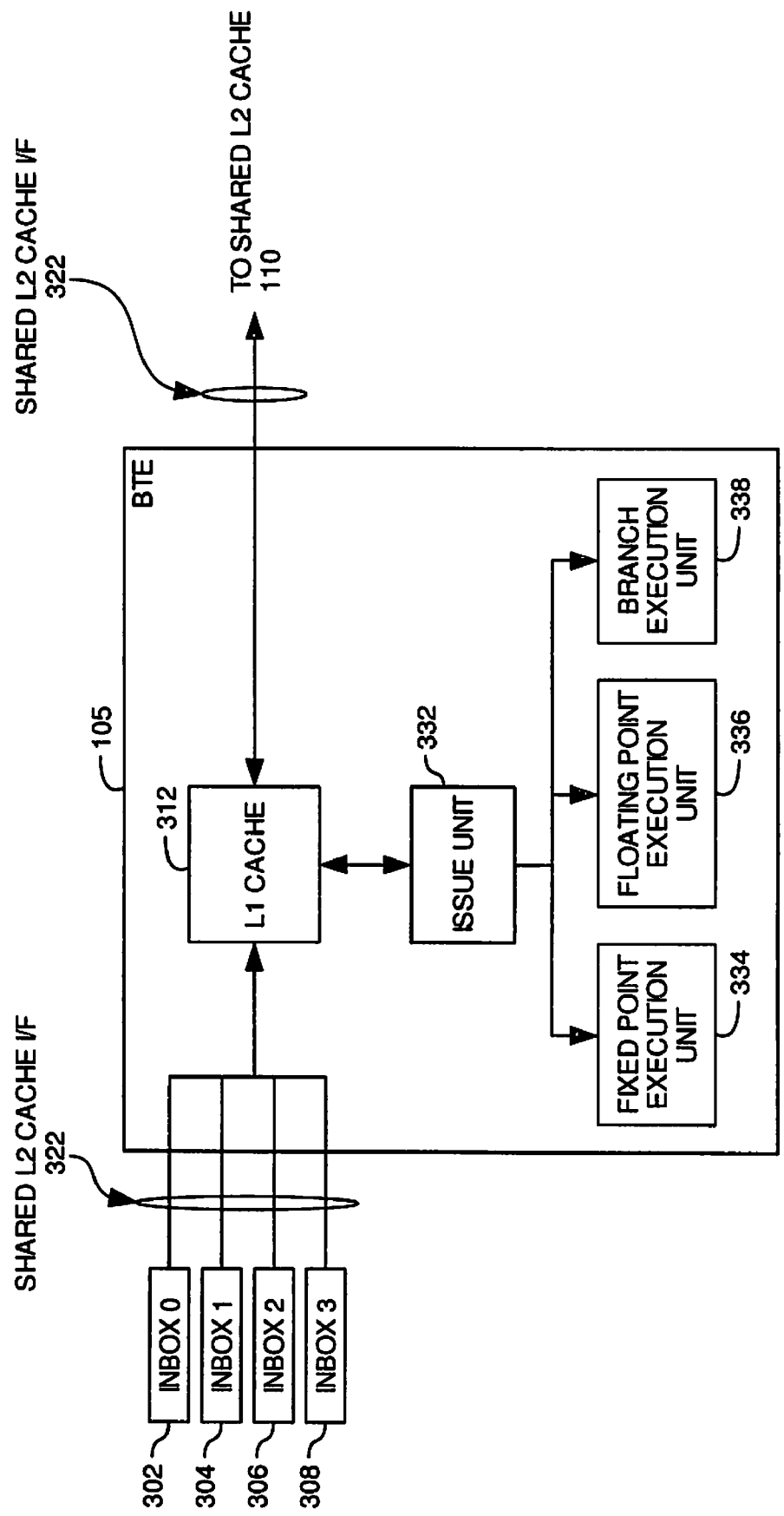

FIG. 3B is a block diagram depicting the path of data from memory inboxes (e.g., inboxes 302 . . . 308) and the shared L2 cache 110 transmitted to and from a processing core (e.g., BTE 105). As described above, both the memory inboxes 302 . . . 308 and the shared L2 cache 110 may be accessed via the shared L2 cache interface 322. Where a thread being executed in the BTE 105 retrieves data from an inbox 302 . . . 308 or from the shared L2 cache 110, the retrieved data may be placed in the L1 cache 312 for the BTE 105. Instructions for the thread may be issued from an issue unit 332. In some cases, the BTE 105 may be configured to execute multiple threads concurrently. Thus, the issue unit 332 may be configured to issue instructions for multiple threads. In some cases, the BTE 105 may provide multiple execution units 334 . . . 338 which may be used to concurrently execute threads in the BTE 105. The execution units 334 . . . 338 may include a fixed point execution unit 334, a floating point execution unit 336, and a branch execution unit 338.

In some cases, a thread may update or produce data which is to be accessed later (e.g., by the same thread or by another thread). Where the updated data is to be accessed later, the thread may place the updated data in an L1 cache 312. Furthermore, where desired, the updated data may also be placed in the L2 cache 110 or in an inbox 302 . . . 308 for the updating thread via the shared L2 cache interface 322. In some cases, as described above, direct access to a given inbox (e.g., inbox 0 302) via the shared L2 cache interface 322 may be limited to the thread (e.g., thread T0) which owns the given inbox.

In one embodiment of the invention, memory space within a memory inbox may be mapped to a global memory address (e.g., all levels of memory including the L1 cache 312, L2 cache 110, and main memory as well as all threads may use the same global memory address to access a given memory inbox). Thus, in one embodiment of the invention, to access the inbox memory space, the owner thread may merely read or write the desired information to a global memory address corresponding to the inbox memory space. A thread which does not own the memory inbox and which attempts to directly access the inbox via the global memory address, may have access to the inbox denied. Other forms of access may instead be provided to other non-owning threads, e.g., via packetized messages sent to the inbox.

Also, in one embodiment of the invention, information being stored in a memory inbox may not be cacheable. For example, while information in the L1 cache 312, L2 cache 110, and other memory level may be automatically cached by the multi core processing element 100 such that information requested from a given memory address may be automatically fetched from main memory and maintained in one of the cache levels 312, 110 while being accessed. In contrast, the globally addressable memory in a given inbox may only be located in the inbox and may not be moved between different levels of the memory hierarchy (e.g., the main memory, the shared L2 cache memory 110 or the L1 cache memory) without being copied to a new address space outside of the inbox. Thus, accesses to an inbox by an owner thread may be performed quickly and directly to the inbox memory without waiting for information to be fetched from another level of the memory hierarchy and/or translated during fetching. The non-cacheability of inbox memory may also apply with respect to packetized access of the inbox described below. Furthermore, in an alternate embodiment of the invention, information stored in the inbox may be cached in other levels of the memory hierarchy.

Assignment of Memory Inboxes

Figure 3C:
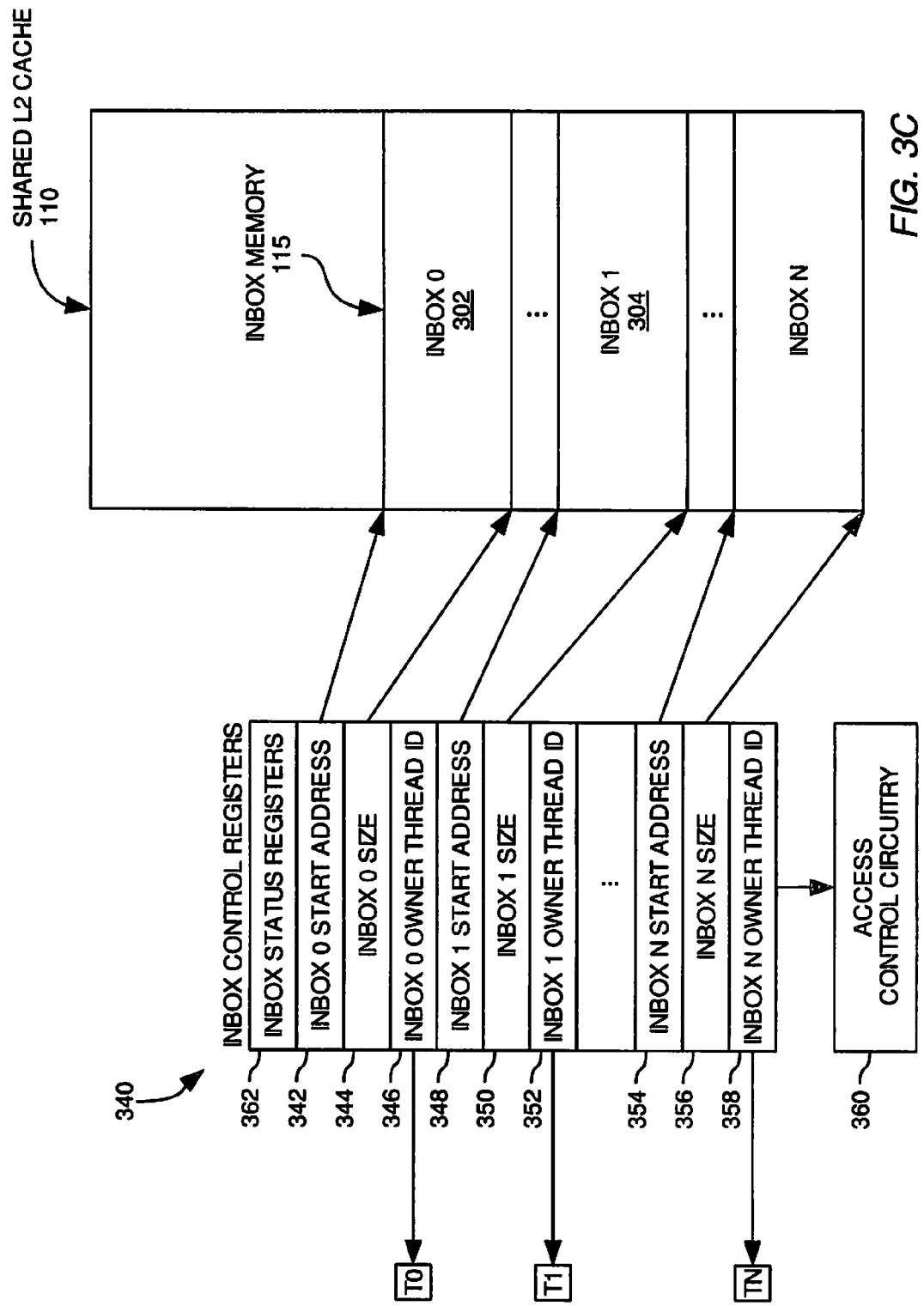

In one embodiment of the invention, memory inboxes may be provided from the shared memory cache 110 (e.g., a portion of the L2 cache 110 may be reserved for the inbox memory 115). FIG. 3C is a block diagram depicting inbox memory 115 partitioned from the shared L2 cache 110 according to one embodiment of the invention.

As depicted, the size and location of each inbox 302, 304, etc. may be controlled by inbox control registers 340. The status of each inbox 302, 304, etc. (e.g., enabled or disabled) may be indicated and/or modified via inbox status registers 362. In one embodiment, access to the inbox control registers 340 may be unrestricted. Optionally, in some cases, access to the inbox control registers may be limited, for example, to a subset of approved threads (e.g., the owner thread, a parent of the owner thread, a specially designated control thread, and/or an operating system kernel thread). In one embodiment, the inbox control registers 340 may include a start address register 342, 348 . . . 354, a size register 344, 350 . . . 356, and an owner thread identification register 346, 352 . . . 358.

In one embodiment, the start address registers 342, 348 . . . 354 may indicate a start address for each inbox 302, 304, etc. The size registers 344, 350 . . . 356 may indicate the size of a corresponding inbox 302, 304, etc. The memory space for an inbox may thus occupy each address beginning from the corresponding start address and ranging through the indicated size of the inbox. The size may be indicated in any manner, for example, as an absolute size in bytes or as an integer multiple of a fixed size (e.g., the size in the size registers 344, 350 . . . 356 may indicate the size in kilobytes).

In one embodiment, the owner thread identification register 346, 352 . . . 358 may identify which thread (e.g., thread T0, T1 . . . TN) owns a given inbox 302, 304, etc. While depicted with respect to threads and corresponding inboxes 1, 2 . . . N, embodiment of the invention may be used with any type of thread and/or inbox identifier (e.g., a number, an address, etc.). In one embodiment of the invention, the inbox identifier register may be used to restrict direct access to memory addresses within the corresponding inbox to the owner thread. In some cases, direct access may also be allowed by a limited selection of other threads, such as, for example, a parent thread of the owner thread, a specified control thread, and/or an operating system kernel thread. In one embodiment, access control circuitry 360 may be used to provide the restricted access.

By assigning portions of the shared memory cache 110 to the inboxes a low-latency high-bandwidth communications network may be formed. The remaining portion of the shared memory cache 110 may remain unassigned and, thus, available to store information which does not relate to communications between processing threads. The remaining portion of the shared memory cache 110 may be used to store geometry and data structures which are used by the image processing system to perform ray tracing (described further below with respect to FIG. 5).

A benefit of using only the inboxes for communications between processing threads and using the remaining portion of the shared memory cache 110 to store geometry and data structures is that no matter how much communications related information is passed through the inboxes, it will not consume the entire memory cache. Thus, as will be described further below, communications related information will not displace the geometry and data structures stored within the remaining portion of the shared memory cache 100. Therefore, data which is likely to be reused when tracing subsequent rays or rendering subsequent frames (object geometry and data structures) may remain in the cache, while data which is unlikely to be reused when tracing subsequent rays or rendering subsequent frames (data processing work) will not remain in the cache.

An Exemplary Three-Dimensional Scene

Figure 4:
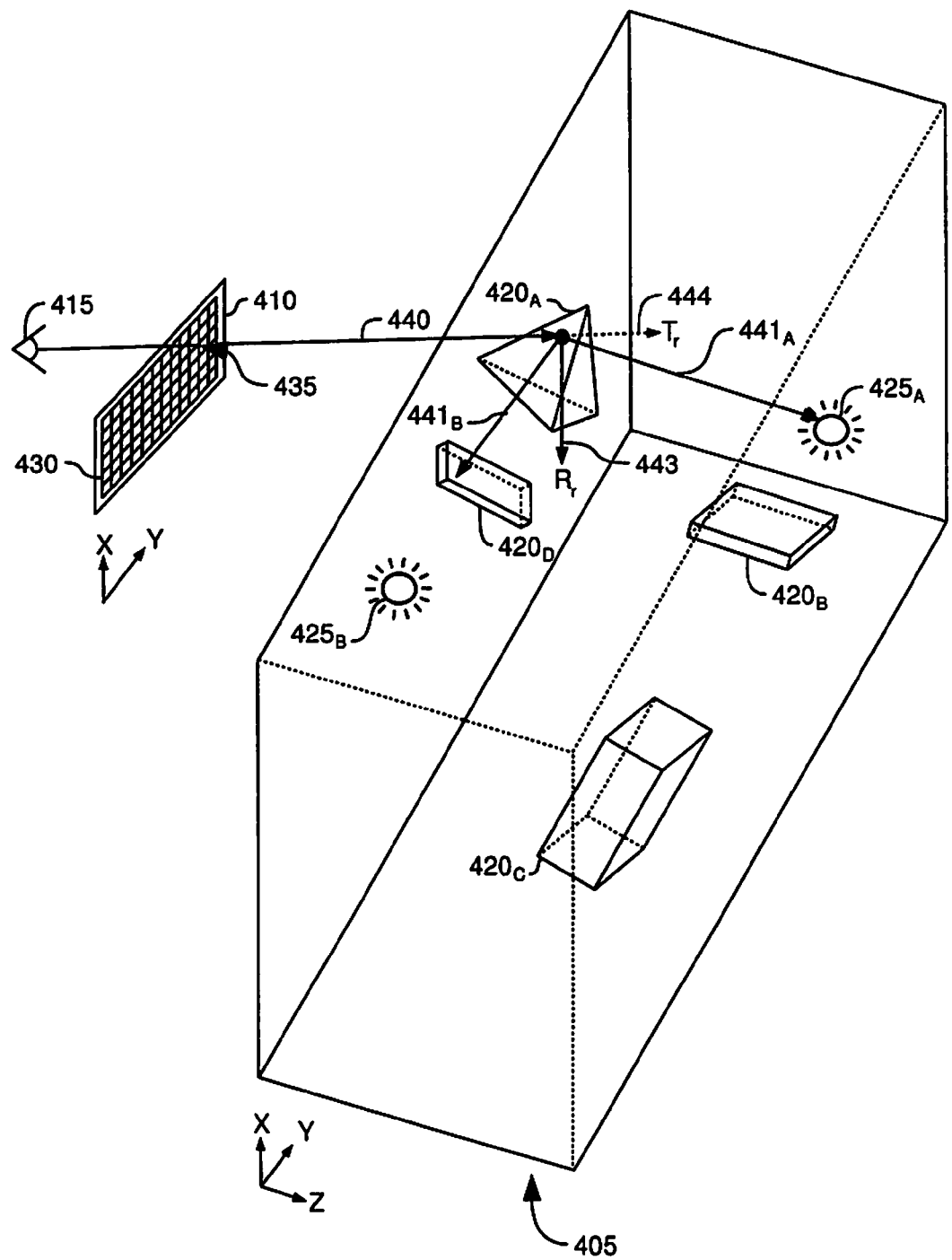
FIG. 4 is an exemplary three-dimensional scene to be rendered by an image processing system, according to one embodiment of the invention.

FIG. 4 is an exemplary three-dimensional scene 405 to be rendered by an image processing system. Within the three-dimensional scene 405 may be objects 420. The objects 420 in FIG. 4 are of different geometric shapes. Although only four objects 420 are illustrated in FIG. 4, the number of objects in a typical three-dimensional scene may be more or less. Commonly, three-dimensional scenes will have many more objects than illustrated in FIG. 4.

As can be seen in FIG. 4 the objects are of varying geometric shape and size. For example, one object in FIG. 4 is a pyramid $420_A$. Other objects in FIG. 4 are boxes $420_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 405 are light sources $425_{A-B}$. The light sources may illuminate the objects 420 located within the scene 405. Furthermore, depending on the location of the light sources 425 and the objects 420 within the scene 405, the light sources may cause shadows to be cast onto objects within the scene 405.

The three-dimensional scene 405 may be rendered into a two-dimensional picture by an image processing system. The image processing system may also cause the two-dimensional picture to be displayed on a monitor 410. The monitor 410 may use many a grid 430 of pixels of different colors to render the final two-dimensional picture.

One method used by image processing systems to rendering a three-dimensional scene 405 into a two dimensional picture is called ray tracing. Ray tracing is accomplished by the image processing system "issuing" or "shooting" rays from the perspective of a viewer 415 into the three-dimensional scene 405. The rays have properties and behavior similar to light rays.

One ray 440, that originates at the position of the viewer 415 and traverses through the three-dimensional scene 405, can be seen in FIG. 4. As the ray 440 traverses from the viewer 415 to the three-dimensional scene 405, the ray 440 passes through a plane where the final two-dimensional picture will be rendered by the image processing system. In FIG. 4 this plane is represented by the monitor 410. The point the ray 440 passes through the plane, or monitor 410, is represented by a pixel 435.

As briefly discussed earlier, most image processing systems use a grid 430 of thousands (if not millions) of pixels to render the final scene on the monitor 41 0. Each individual pixel may display a different color to render the final composite two-dimensional picture on the monitor 410. An image processing system using a ray tracing image processing methodology to render a two dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 435 in the two dimensional picture, the image processing system must determine if the ray 440 intersects an object within the scene. If the ray does not intersect an object within the scene it may be assigned a default background color (e.g., blue or black, representing the day or night sky). Conversely, as the ray 440 traverses through the three-dimensional scene the ray 440 may strike objects. As the rays strike objects within the scene the color of the object may be assigned the pixel through which the ray passes. However, the color of the object must be determined before it is assigned to the pixel.

Many factors may contribute to the color of the object struck by the original ray 440. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 440 intersected the object. For example, one type of secondary ray may be a shadow ray. A shadow ray may be used to determine the contribution of light to the point where the original ray 440 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 405. If the ray reaches the light source without encountering another object before the ray reaches the light source, then the light source will illuminate the object struck by the original ray at the point where the original ray struck the object.

For example, shadow ray $441_A$ may be issued from the point where original ray 440 intersected the object $420_A$, and may traverse in a direction towards the light source $425_A$. The shadow ray $441_A$ reaches the light source $425_A$ without encountering any other objects 420 within the scene 405. Therefore, the light source $425_A$ will illuminate the object $420_A$ at the point where the original ray 440 intersected the object $420_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $441_B$ may be issued from the point where the original ray 440 intersected with the object $420_A$, and may traverse in a direction towards the light source $425_B$. In this example, the path of the shadow ray $441_B$ is blocked by an object $420_D$. If the object $420_D$ is opaque, then the light source $425_B$ will not illuminate the object $420_A$ at the point where the original ray 440 intersected the object $420_A$. However, if the object $420_D$ which the shadow ray is translucent or transparent the light source $425_B$ may illuminate the object $420_A$ at the point where the original ray 440 intersected the object $420_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 444 is seen traversing through the object $420_A$ which the original ray 440 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 443 may be issued by the image processing system to determine what color or light may be reflected by the object $420_A$ which the original ray 440 intersected.

The total contribution of color and light of all secondary rays (e.g., shadow rays, transmitted rays, reflected rays, etc.) will result in the final color of the pixel through which the original ray passed.

An Exemplary KD-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, kdimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 5A:
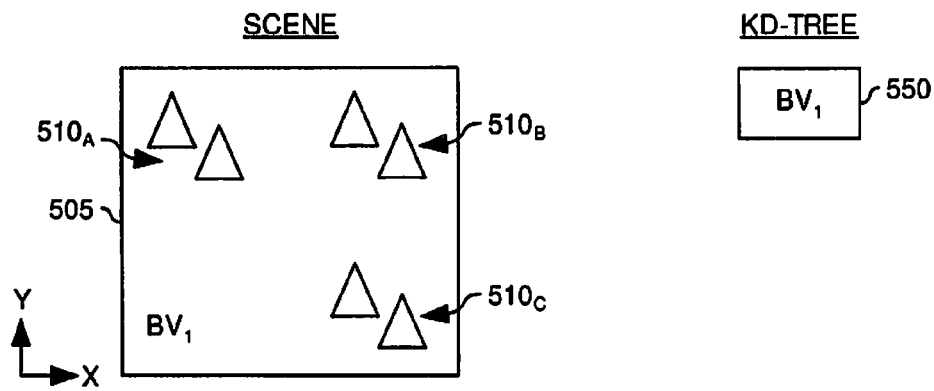
FIGS. 5A-5C illustrate a two dimensional space to be rendered by an image processing system and a corresponding spatial index created by an image processing system, according to one embodiment of the invention.
Figure 5B:
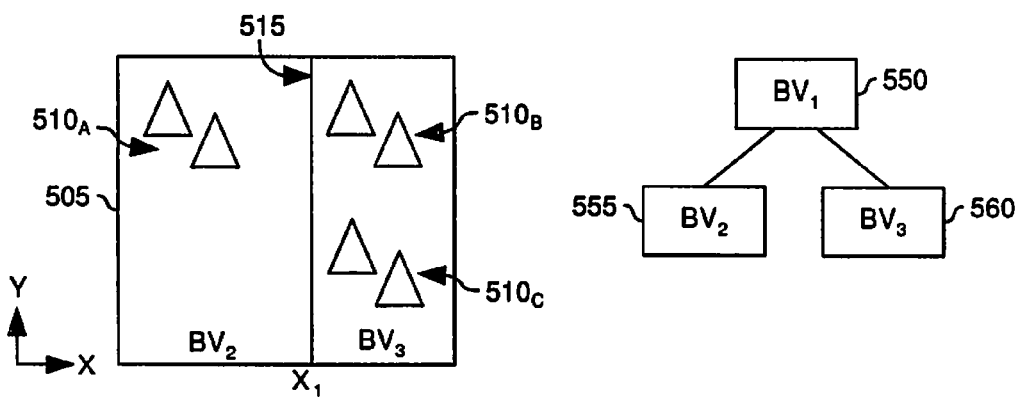
Figure 5C:
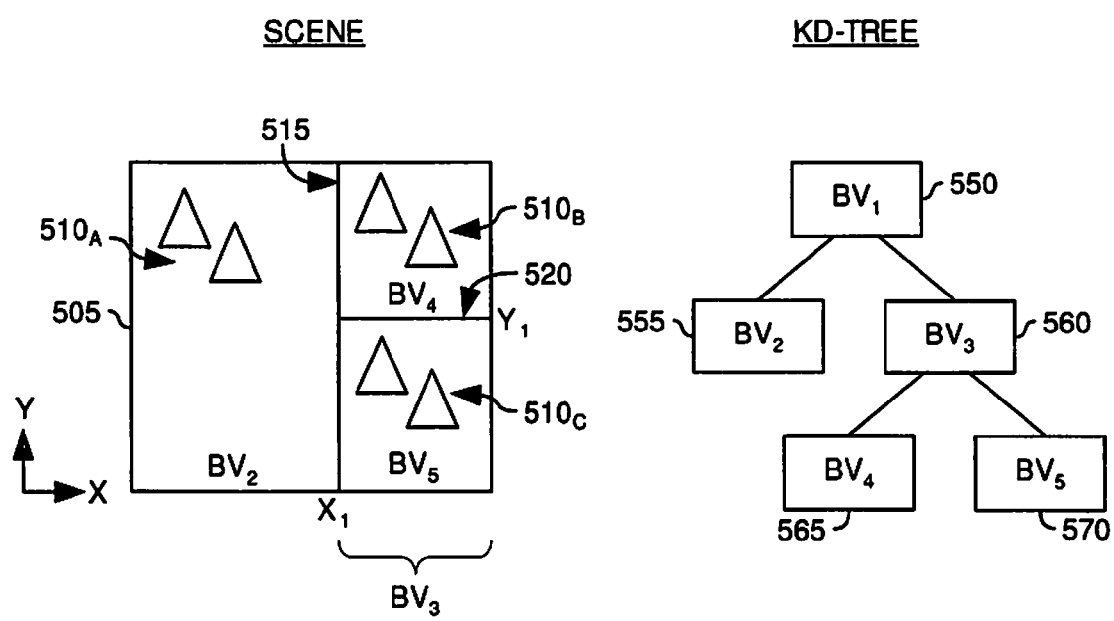

FIGS. 5A-5C illustrate a two dimensional space to be rendered by an image processing system and a corresponding kd-tree. For simplicity, a two dimensional scene is used to illustrate the building of a kd-Tree, however kd-Trees may also be used to represent three-dimensional scenes. In the two dimensional illustration of FIGS. 5A-5C splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 5A illustrates a two dimensional scene 505 containing primitives 510 to be rendered in the final picture to be displayed on a monitor 510. The largest volume which represents the entire volume of the scene is encompassed by bounding volume 1 ($BV_1$). In the corresponding kd-Tree this may be represented by the top level node 550, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 5A, $BV_1$ contains six primitives, therefore kd-Tree construction algorithm may partition $BV_1$ into smaller bounding volumes.

FIG. 5B illustrates the same two dimensional scene 505 as illustrated in FIG. 5A. However, in FIG. 5B the tree construction algorithm has partitioned $BV_1$ into two smaller bounding volumes $BV_2$ and $BV_3$. The partitioning of $BV_1$, was accomplished, by drawing a splitting plane $SP_1$ 515 along the x-axis at point $x_1$. This partitioning of $BV_1$ is also reflected in the kd-Tree as the two nodes 555 and 560, corresponding to $BV_2$ and $BV_3$ respectively, under the internal or parent node $BV_1$ 550. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $510_A$). Nodes which are not partitioned or sub-divided any further, such as $BV_2$, are referred to as leaf nodes.

FIG. 5C illustrates the same two dimensional scene 505 as illustrated in FIG. 5B. However, in FIG. 5C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 565 and 570, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $510_A$, leaf node $BV_4$ may contain pointers to primitives $510_B$ and leaf node $BV_5$ may contain pointers to primitives $510_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in the shared memory cache 110. The kd-Tree and the size of corresponding data which comprises the kd-Tree may be optimized for storage in the shared memory cache 110.

Jittering Splitting Planes

As described above, when building a spatial index (e.g., a kd-tree), a spatial index building algorithm (e.g., a tree building algorithm) may draw splitting planes (e.g., axis aligned splitting planes for a kd-tree) in order to partition a three dimensional scene into bounding volumes. The tree building algorithm may take into consideration various factors when determining the most efficient location to draw or create the splitting planes within the three dimensional scene. For example, in an effort to balance workload evenly amongst processing elements, the tree building algorithm may draw a splitting plane along an axis such that two volumes created by the splitting plane contain a relatively equal number of primitives.

Figure 6:
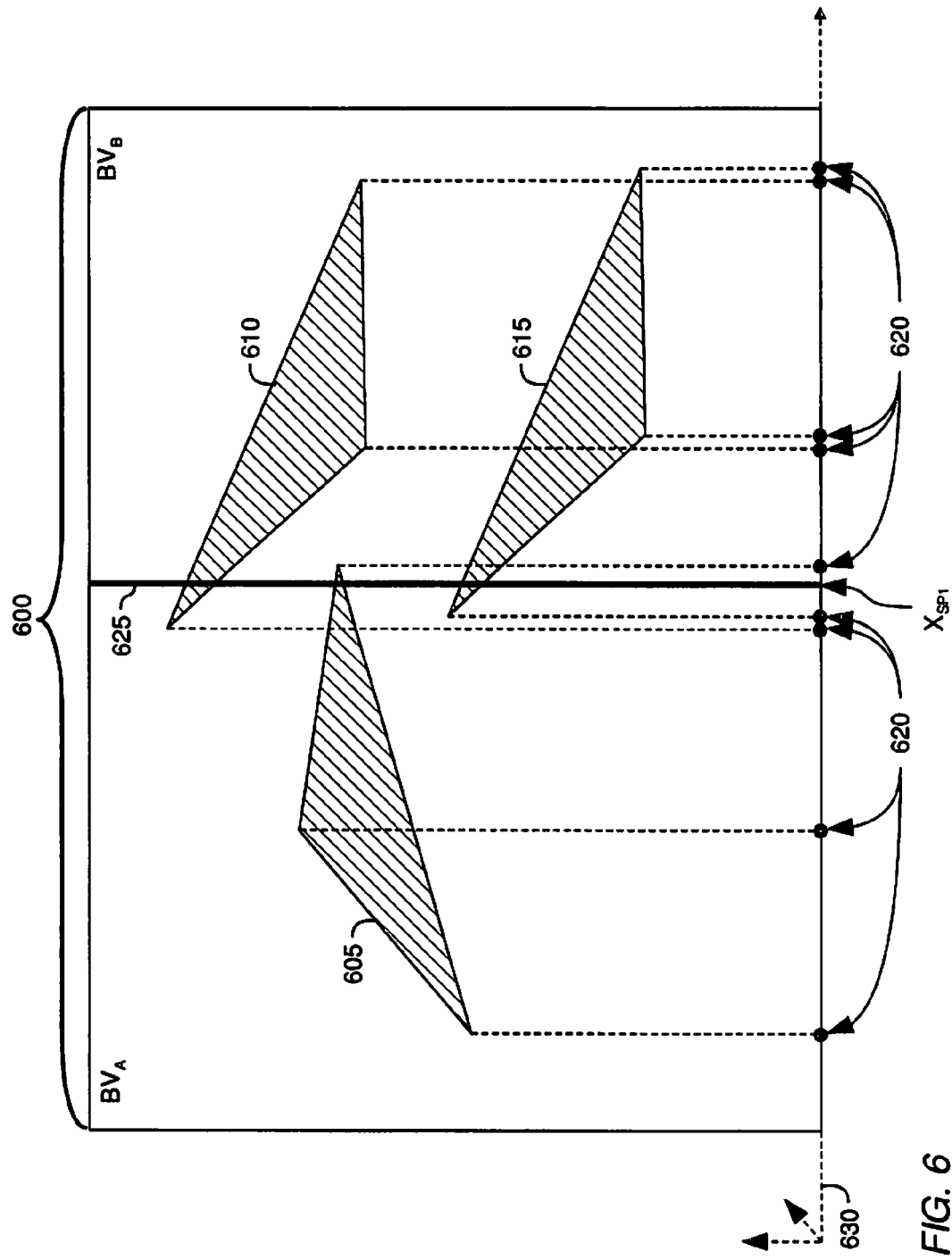
FIGS. 6, 8 and 9 illustrate an exemplary three-dimensional space to be rendered by an image processing system, according to one embodiment of the invention.

For example, FIG. 6 illustrates a bounding volume 600 containing a first primitive 605, a second primitive 610, and a third primitive 615. FIG. 6 also illustrates an initial splitting plane 625, which partitions the bounding volume 600 into two smaller bounding volumes (i.e., $BV_A$ and $BV_B$). The tree building algorithm may attempt to draw the splitting plane 625 such that a relatively equal number of primitives are located within the two volumes created by the splitting plane 625. The tree building algorithm may do this by first projecting the vertices of the primitives onto a splitting plane or reference axis 630, and then locating the splitting plane at a point along the reference axis 630 which is relatively in the middle of all the projected vertex points.

For example, as illustrated in FIG. 6, the tree building algorithm has projected all of the vertices of the primitives to points (projected vertex points 620) along the reference axis 630. Furthermore, as illustrated in FIG. 6 the initial location of the splitting plane 625 is at a point $X_{SP1}$ located relatively in the middle of all the projected vertex points 620. However, as can be seen by the illustration in FIG. 6, the axis-aligned splitting plane 625 drawn perpendicular to the reference axis 630 at point $X_{SP1}$ intersects all three primitives (i.e., the first primitive 605, the second primitive 610, and the third primitive 615) located within the bounding volume 600. Consequently, all of the primitives located within the bounding volume 600 are located within both bounding volumes (i.e., $BV_A$ and $BV_B$) created by the splitting plane 625.

Intersecting or splitting primitives may increase workload experienced by a ray tracing image processing system. The workload may be increased because the number of ray-primitive intersection tests which may need to be performed is increased when a primitive occurs in more than one bounding volume.

For example, a ray may intersect both bounding volumes in FIG. 6 (i.e., $BV_A$ and $BV_B$). However, the ray may not strike any primitives in either bounding volume. In order for the image processing system to determine that the ray does not strike any primitives within either bounding volume six ray-primitive intersection tests may be necessary with the splitting plane location ($X_{SP1}$) in FIG. 6.

First, three ray-primitive intersection tests may be executed with the ray and all three primitives occurring within $BV_A$ (i.e., the first primitive 605, the second primitive 610, and the third primitive 615). Next, three more ray-primitive intersection tests may be executed with the ray and all three primitives occurring within $BV_B$ (i.e., the first primitive 605, the second primitive 610, and the third primitive 615). Therefore, even through only three primitives are within the partitioned bounding volume 600, the splitting plane location ($X_{SP1}$) may necessitate six ray-primitive intersection tests to determine if a ray intersects a primitive within the bounding volume 600.

Furthermore, because of the splitting plane 625 only a small portion of a primitive may be located within a bounding volume (e.g., the small portion of the first primitive 605 located within $BV_2$). Consequently, a ray which intersects the bounding volume (e.g., $BV_2$) may have a low likelihood of intersecting the primitive (e.g., the first primitive 605). However, a ray-primitive intersection test may still be necessary each time a ray intersects the bounding volume. Thus, a large amount of effort (in terms of ray-primitive intersection tests) may be expended on the part of the image processing system even though the likelihood that a ray intersects the primitive may be low.

However, in an effort to optimize the location of splitting planes and thus reduce the number of ray-primitive intersection tests, according to embodiments of the invention, a splitting plane may be jittered after the splitting plane is initially drawn. By jittering the splitting plane, or iteratively moving the location of the splitting plane along the reference axis, a new and more efficient location which intersects fewer primitives may be located. A new location which intersects fewer primitives may improve efficiency by decreasing the number of ray-primitive intersection tests performed by the image processing system thereby reducing processing overhead.

Figure 7:
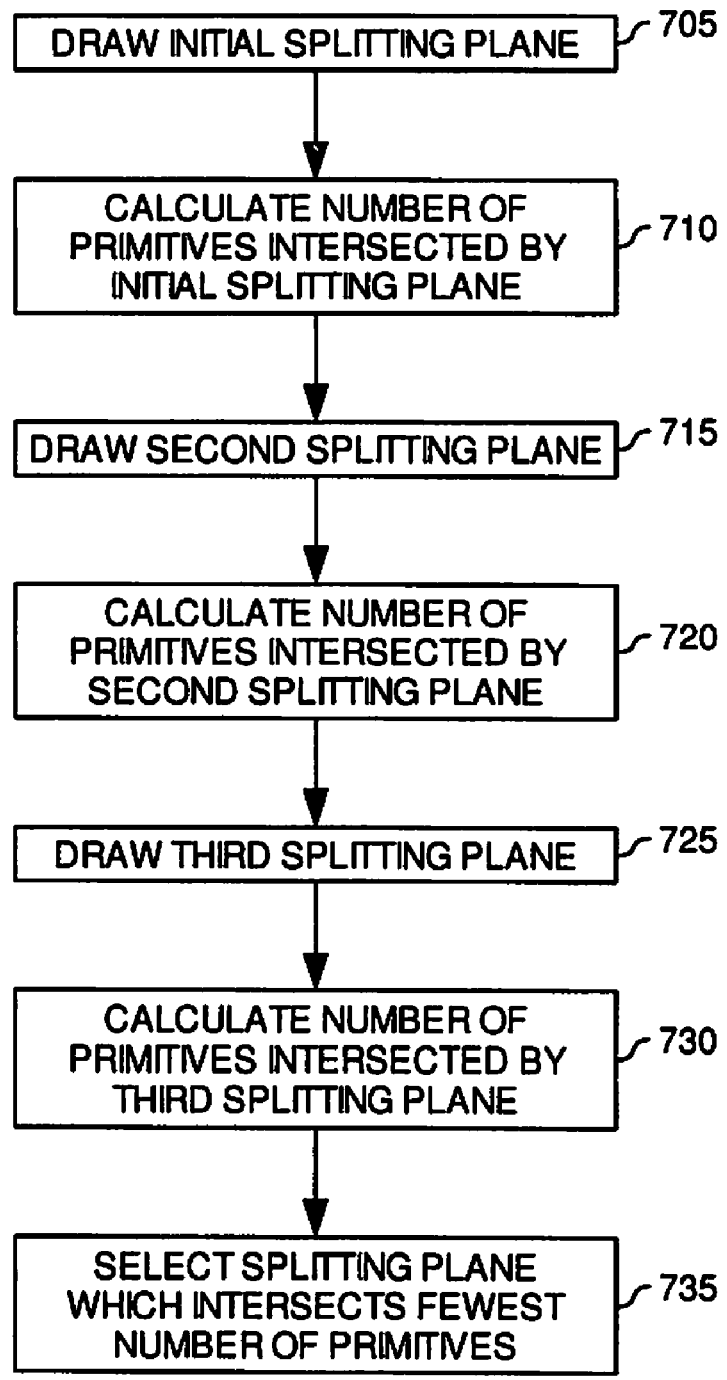
FIG. 7 is a flowchart illustrating a method of creating splitting planes for a spatial index, according to one embodiment of the invention.

FIG. 7 is a flowchart illustrating an exemplary method 700 of jittering splitting planes, according to one embodiment of the invention. The method 700 begins at step 705 where the tree building algorithm draws an initial splitting plane at a point along the reference axis. For example, as illustrated in FIG. 6, the tree building algorithm may draw the initial splitting plane 625 at the point $X_{SP1}$ along the reference axis 630.

Next, at step 710, the tree building algorithm may calculate the number of primitives intersected by the initial splitting plane. For example, with respect to FIG. 6, the tree building algorithm may determine that three primitives (i.e., the first primitive 605, the second primitive 610, and the third primitive 615) are intersected by the initial splitting plane 625.

The tree building algorithm may now begin a series of steps to jitter or move the splitting plane. By jittering the splitting plane the tree building algorithm may determine if a location for the splitting plane exists where the splitting plane will intersect fewer primitives.

Therefore, after step 710, the tree building algorithm may proceed to step 715 where the tree building algorithm may draw a second splitting plane. The second splitting plane may be drawn at a location some distance from the first splitting plane, wherein in the illustrated example the distance is in a positive direction along the reference axis.

The distance from the first splitting plane to the second splitting plane may be a constant or may be varied. A constant distance (displacement) may be used by the tree building algorithm when jittering splitting planes in each bounding volume. Thus, no matter what bounding volume the tree building algorithm is partitioning, the distance between the initial splitting plane to the jittered (e.g., second) splitting plane may be the same. However, if the tree building algorithm uses a variable distance, then the distance between the first splitting plane and the second splitting plane may change depending on the bounding volume being partitioned.

A variable distance may be controlled by various factors. For example, according to one embodiment of the invention, a the distance from the first splitting plane to the second splitting plane may be determined based on the number of vertices which are projected onto the reference axis in a relatively close proximity to the location of the first splitting plane along the reference axis. For example, if a large group of vertices are projected onto the reference axis in a relatively close proximity to the location of the first splitting plane, the tree building algorithm may choose the location of the second splitting plane a distance from the first splitting plane such that the second splitting plane is past the group of vertices. This distance may be chosen by the tree building algorithm in an attempt to intersect less primitives with the second splitting plane. Thus, the distance from the first splitting plane to the second splitting plane may be dependent on the location of primitives within a particular bounding volume and consequently may vary from bounding volume to bounding volume.

After drawing the second splitting plane, the tree building algorithm may proceed to step 720 where it may calculate the number of primitives intersected by the second splitting plane.

Figure 8:
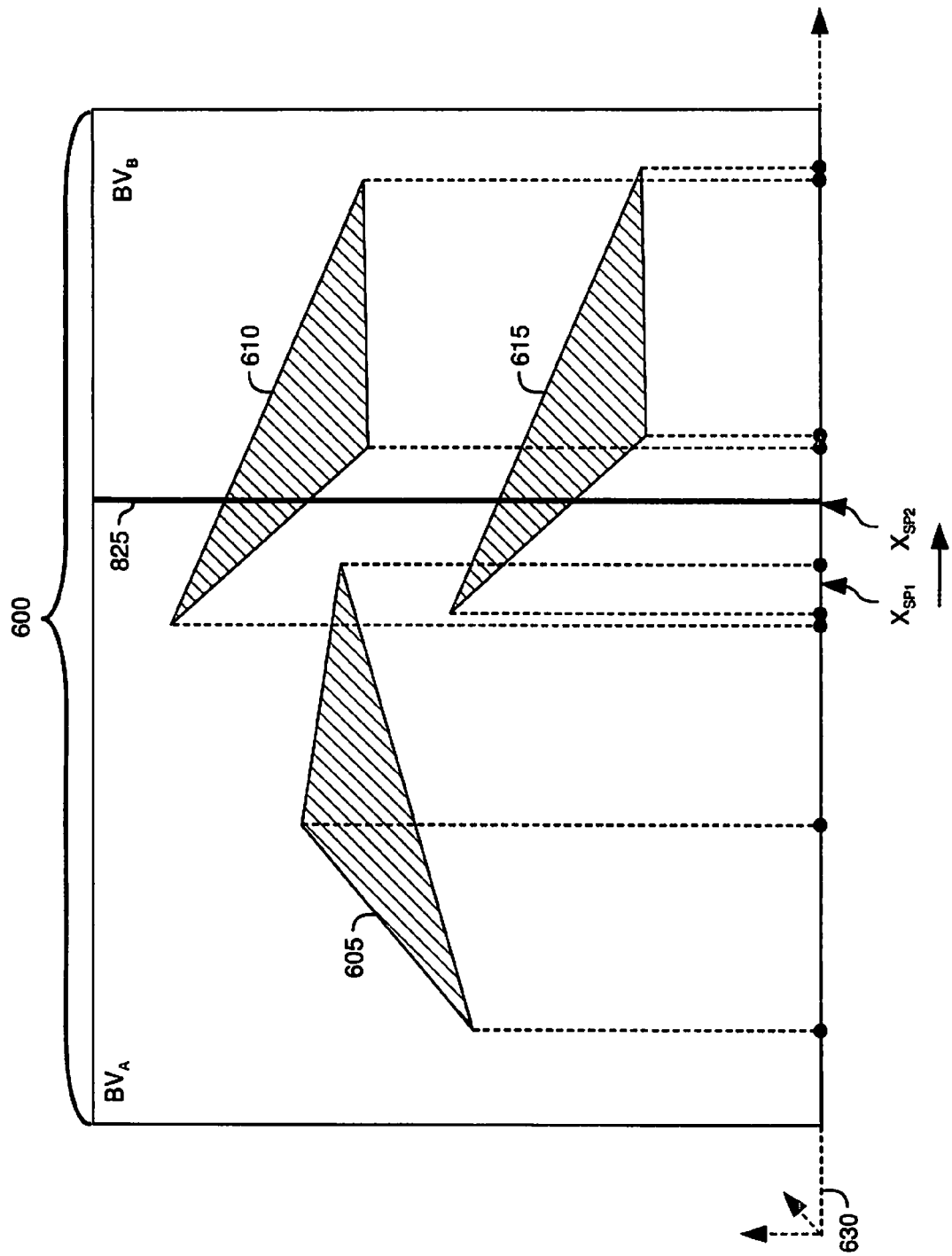

For example, FIG. 8 illustrates a second splitting plane 825 drawn at a location $X_{SP2}$ in a positive direction along the reference axis 630 with respect to the initial location $X_{SP1}$ of the splitting plane. Furthermore, at step 720 the tree building algorithm may determine that the second splitting plane 825 intersects two primitives (i.e., intersects the second primitive 610 and the third primitive 615) in the bounding volume 600.

In contrast to the first splitting plane 625 shown in FIG. 6, the second splitting plane 825 intersects fewer primitives (3 vs. 2). Consequently, the second splitting plane 825 may be a more efficient splitting plane than the first.

The second splitting plane 825 may be a more efficient splitting plane to use in the spatial index because it may reduce the number of ray primitive intersection tests which may be performed when performing ray tracing using the spatial index. For example, as described earlier, if the first splitting plane 625 were selected by the tree building algorithm and if an original ray intersected both $BV_A$ and $BV_B$ yet did not strike any primitives in either $BV_A$ or $BV_B$, a total of six original ray-primitive intersection tests may have to be performed to determine that the original ray did not intersect any primitives within either $BV_A$ or $BV_B$. The six ray-primitive intersection tests including the original ray and: 1) the first primitive 605 in $BV_A$; 2) the second primitive 610 in $BV_A$; 3) the third primitive 615 in $BV_A$; 4) the first primitive 605 in $BV_B$; 5) the second primitive 610 in $BV_B$; and 6) the third primitive 615 in $BV_B$.

However, if the tree building algorithm selected the second splitting plane 825, only five original ray primitive tests may be necessary to determine if the original ray intersected any primitives located within the bounding volume 600. The five ray-primitive intersection tests including the original ray and: 1) the first primitive 605 in $BV_A$; 2) the second primitive 610 in $BV_A$; 3) the third primitive 615 in $BV_A$; the second primitive 610 in $BV_B$; and 4) the third primitive 615 in $BV_B$. Thus, choosing the second splitting plane is more efficient by at least one ray-primitive intersection test in comparison to the first splitting plane.

After the tree building algorithm has determined the number of primitives intersected by the second splitting plane, the tree building algorithm may continue jittering the splitting plane in an attempt to find a location which intersects still fewer primitives.

Therefore, at step 725 the tree building algorithm may draw a third splitting plane. The third splitting plane may be drawn at a location some distance from the first splitting plane in a negative direction along the reference axis. According to one embodiment of the invention, the distance from the first splitting plane may be constant (e.g., the same as the distance between the first and second splitting planes) or may be variable as described above. Next, at step 730 the tree building algorithm may calculate the number of primitives intersected by the third splitting plane.

Figure 9:
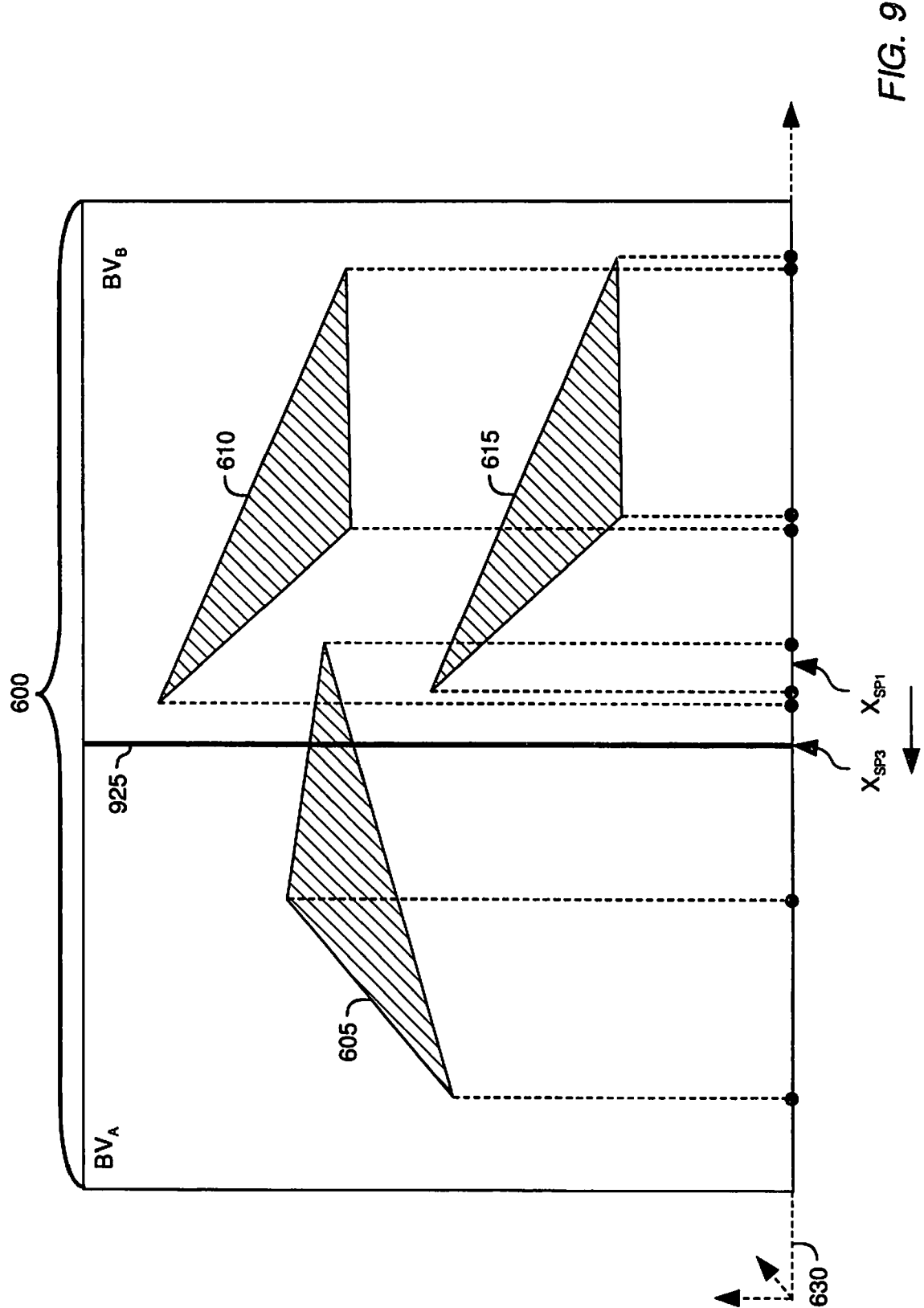

For example, FIG. 9 illustrates a third splitting plane 925 at a third location $X_{SP3}$ along the reference axis 630. The third splitting plane 925 may be positioned at a location some distance in the negative direction along the reference axis 630 from the first location $X_{SP1}$. Furthermore, the tree building algorithm may determine that the third splitting plane 925 intersects one primitive (i.e., the first primitive 605) within the bounding volume 600.

After calculating the number of primitives intersected by the third splitting plane, the tree building algorithm may proceed to step 735. At step 735, the tree building algorithm may select the splitting plane location which intersected the fewest primitives within the three-dimensional scene. For example, of the three splitting planes created in method 700, the tree building algorithm may select the third splitting plane 925, because the third splitting plane 925 only intersects one primitive within the bounding volume 600. Consequently, the third splitting plane 925 may reduce the number of ray-primitive intersection tests which may be necessary when performing ray tracing.

Although the example described above describes the invention as using two movements of the splitting plane to determine a more efficient location, according to other embodiments of the invention the tree building algorithm may move the splitting plane more times (e.g., three or four times) in an attempt to find a more efficient location for the splitting plane. For example, according to one embodiment of the invention, a minimum number of primitive intersections may be set by the three building algorithm and the tree building algorithm may continue to move the splitting plane as many times as necessary until the splitting plane intersects the minimum number of primitives or less.

Similarly, according to another embodiment of the invention, the tree building algorithm may move the splitting plane fewer than two times to determine a more efficient location for the splitting plane. For example, according to one embodiment of the invention a threshold number of primitives may need to be intersected by the splitting plane before the splitting plane is moved to additional locations. Thus, the three building algorithm may stop after moving the splitting plane one time if the moved splitting plane intersects fewer primitives than the threshold.

Furthermore, in the preceding description of jittering splitting planes, reference is made to splitting planes with regards to kd-trees and axis-aligned bounding volumes. However, it should be understood that the invention is not limited to kd-trees or axis aligned bounding volumes alone. Instead, the jittering of splitting lines or splitting planes may be used with any spatial partitioning data structure (e.g., bsp trees, octrees, etc.).

It should also be noted that embodiments of the invention are not limited to jittering splitting planes along a single axis. When creating a spatial index splitting planes may be drawn perpendicular to all three axis in a three dimensional scene in order to create bounding volumes. Thus, the splitting planes may be jittered along each axis according to the splitting plane being drawn for the spatial index.

CONCLUSION

By jittering splitting planes when building a spatial index a reduction in the amount of ray-primitive intersection tests may be achieved. This reduction may also reduce the amount of time and processing power to perform ray tracing. Therefore, jittering splitting planes may improve efficiency in a ray tracing image processing system.

While the foregoing is directed to embodiments of the present invention, other and further embodiments of the invention may be devised without departing from the basic scope thereof, and the scope thereof is determined by the claims that follow.

What is claimed is:

1. A method, comprising:
   creating a spatial index having nodes representing bounding volumes in a three dimensional scene, comprising:
   a) drawing an initial splitting plane within a bounding volume at a first point along a reference axis;
   b) determining a number of primitives intersected by the initial splitting plane; and
   c) jittering the splitting plane along the reference axis and by operation of one or more computer processors to determine a location for the splitting plane where fewer primitives are intersected; wherein jittering the splitting plane comprises:
      selecting a second point a first distance from the first point along the reference axis, wherein the second point is oriented in a first direction along the reference axis with respect to the first point, and wherein selecting the second point comprises:
         determining if a group of vertices are close to the first point in the first direction; and
         if so, selecting the second point to be a distance from the first point beyond the group of vertices in the first direction;
      drawing a second splitting plane within the bounding volume at the second point; and
      determining a number of primitives intersected by the second splitting plane.

2. The method of claim 1, wherein drawing an initial splitting plane within the bounding volume at a first point along the reference axis comprises:
   projecting vertices of primitives within the bounding volume onto the reference axis; and
   determining the first point to be within the middle of the projected vertices.

3. The method of claim 1, wherein creating the spatial index further comprises:
   selecting a third point a second distance from the first point along the reference axis, and wherein the third point is oriented in a second direction along the reference axis with respect to the first point;

drawing a third splitting plane within the bounding volume at the third point;

determining a number of primitives intersected by the third splitting plane; and selecting the splitting plane which intersects the fewest number of primitives.

4. The method of claim 3, wherein the first direction is a positive direction along the reference axis and the second direction is a negative direction along the reference axis.

5. The method of claim 3, wherein the first distance and the second distance are the same distance.

6. A method, comprising:

creating a spatial index having nodes representing bounding volumes in a three dimensional scene, comprising:

a) drawing an initial splitting plane within a bounding volume at a first point along a reference axis;

b) determining a number of primitives intersected by the initial splitting plane;

c) jittering the splitting plane along the reference axis and by operation of one or more computer processors to determine a location for the splitting plane where fewer primitives are intersected; wherein jittering the splitting plane comprises:

selecting a second point a first distance from the first point along the reference axis, wherein the second point is oriented in a first direction along the reference axis with respect to the first point, and wherein selecting the second point comprises:

(i) determining if a group of vertices are close to the first point in the first direction; and (ii) if so, selecting the second point to be a distance from the first point beyond the group of vertices in the first direction;

drawing a second splitting plane within the bounding volume at the second point; and determining a number of primitives intersected by the second splitting plane;

d) selecting a third point a second distance from the first point along the reference axis, wherein the third point is oriented in a second direction along the reference axis with respect to the first point and wherein the first distance and the second distance are the same distance;

e) drawing a third splitting plane within the bounding volume at the third point;

f) determining a number of primitives intersected by the third splitting plane; and g) selecting the splitting plane which intersects the fewest number of primitives.

7. The method of claim 6, wherein drawing an initial splitting plane within the bounding volume at a first point along the reference axis comprises:

projecting vertices of primitives within the bounding volume onto the reference axis; and determining the first point to be within the middle of the projected vertices.

8. The method of claim 6, wherein the first direction is a positive direction along the reference axis and the second direction is a negative direction along the reference axis.

9. A method, comprising:

creating a spatial index having nodes representing bounding volumes in a three dimensional scene, comprising:

a) drawing an initial splitting plane within a bounding volume at a first point along a reference axis;

b) determining a number of primitives intersected by the initial splitting plane;

c) jittering the splitting plane along the reference axis and by operation of one or more computer processors to determine a location for the splitting plane where fewer primitives are intersected; wherein jittering the splitting plane comprises:

selecting a second point a first distance from the first point along the reference axis, wherein the second point is oriented in a first direction along the reference axis with respect to the first point, and wherein selecting the second point comprises:

(i) determining if a first group of vertices are close to the first point in the first direction; and (ii) if so, selecting the second point to be a distance from the first point beyond the first group of vertices in the first direction;

drawing a second splitting plane within the bounding volume at the second point; and determining a number of primitives intersected by the second splitting plane;

d) selecting a third point a second distance from the first point along the reference axis, wherein the third point is oriented in a second direction along the reference axis with respect to the first point and wherein selecting the third point comprises:

determining if a second group of vertices are close to the first point in the second direction; and if so, selecting the third point to be a distance from the first point beyond the second group of vertices in the second direction;

e) drawing a third splitting plane within the bounding volume at the third point;

f) determining a number of primitives intersected by the third splitting plane; and g) selecting the splitting plane which intersects the fewest number of primitives.

10. The method of claim 9, wherein drawing an initial splitting plane within the bounding volume at a first point along the reference axis comprises:

projecting vertices of primitives within the bounding volume onto the reference axis; and determining the first point to be relatively within the middle of the projected vertices.

11. The method of claim 9, wherein the first direction is a positive direction along the reference axis and the second direction is a negative direction along the reference axis.

12. The method of claim 9, wherein the first distance and the second distance are the same distance.

* * * * *